United States Patent Office 3,025,294
Patented Mar. 13, 1962

3,025,294
NEW QUATERNARY N-(SUBSTITUTED-AMINO-ALKYL)-TETRACHLOROISOINDOLINES
Charles Ferdinand Huebner, Chatham, N.J., assignor to Ciba Pharmaceutical Products, Inc., Summit, N.J., a corporation of New Jersey
No Drawing. Filed Aug. 18, 1955, Ser. No. 529,341
11 Claims. (Cl. 260—247.5)

This application is a continuation-in-part of my co-pending applications Serial No. 448,123, filed August 5, 1954, Serial No. 473,431, filed December 6, 1954 and Serial No. 492,312, filed March 4, 1955, all now abandoned.

The present invention relates to quaternary N-(substituted-aminolakyl)-tetrachloroisoindolines of the formula:

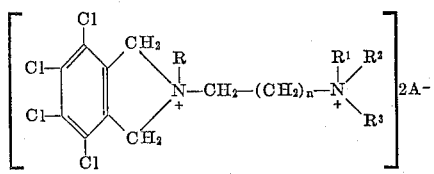

and processes for their manufacture, wherein $n$ is an integer not greater than 2 and preferably 1 and wherein R, $R^1$, $R^2$ and $R^3$ are lower alkyl radicals or wherein

taken together is a heterocycloaliphatic radical containing from 4 to 5 carbon atoms such as pyrrolidino, piperidino or morpholino, A is a therapeutically useful anion such as the anion of acids for examples, hydrohalic i.e. hydrochloric, hydrobromic or hydriodic, phosphoric, nitric, oxalic, acetic, citric, tartaric, aryl sulfonic e.g. p-toluenesulfonic, or alkanesulfonic, e.g. methanesulfonic, or alkylsulfuric acids or hydroxyl, and especially the chlorine anion.

The novel compounds of the invention are prepared by treating a compound of the formula:

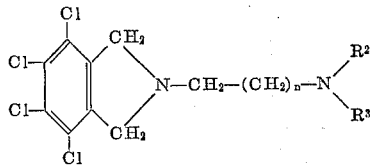

wherein $n$, $R^2$ and $R^3$ have the above given meanings, or an appropriate mono-quaternary derivative thereof with a quaternizing agent capable of introducing a lower alkyl residue, especially reactive esters of lower alkanols, such as lower alkyl halides, lower alkyl p-toluenesulfonates, or di(lower) alkyl sulfates, so as to produce the corresponding diquaternary compound. The reaction is carried out preferably in the presence of solvents, advantageously solvents free of hydroxyl groups, such as for example dimethyl formamide, and at an elevated temperature, if necessary in a closed vessel. Quaternary salts of other acids useful for the formation of therapeutically useful salts such as sulfuric, acetic, tartaric, citric acid and the like are produced, for example, from the iodides by double decomposition, e.g. by treatment of the quaternary iodides in alcoholic solution with the silver salt of the desired acid. Alternatively, the free quaternary hydroxide may be formed by treating the quaternary halide salt with silver oxide in aqueous or alcoholic solution followed by neutralization with the desired acid, or by means of an anion exchanger. The quarternary iodides may be converted to the chlorides by refluxing with an excess of methanolic hydrogen chloride, the iodide anion being removed as methyl iodide.

The starting materials used can be obtained according to one of the following methods.

The 2-(di-substituted-aminoalkyl) - 4,5,6,7 - tetrachloroisoindolines, for example, are prepared conveniently by heating either with or without solvent such as acetic acid, a mixture of 3,4,5,6-tetrachlorophthalic anhydride with an excess of di-substituted-aminoalkylamine to give the 3,4,5,6-tetrachloro-N-(di-substituted-aminoalkyl) - phthalimides which by hydrogenation, for example using lithium aluminum hydride, yield the desired di-tertiary amines used as starting material. The same compounds can be made by treating potassium 3,4,5,6-tetrachlorophthalimide in a solvent such as dimethyl formamide with a di-substituted-aminoalkyl halide followed by reduction of the 3,4,5,6-tetrachloro-N-(di-substituted aminoalkyl)-phthalimide as indicated above. The reduction to the di-tertiary amines may also be carried out electrolytically.

Monoquaternary compounds used as starting material can be obtained, for example, by treating 4,5,6,7-tetrachloro-2-(di-substituted-aminoalkyl) - isoindolines with agents capable of introducing a lower alkyl radical, under mild conditions such as normal or slightly elevated temperatures and/or avoiding an excess of quaternizing agents and/or reacting over a short period of time and/or using an only moderately reactive ester, such as a chloride, so that only the amino group of the aminoalkyl radical being the more basic one is attacked. Such monoquaternary compounds may be also obtained by reacting, for example a 4,5,6,7-tetrachloro-2-lower alkyl-isoindoline with a reactive ester of a di-substituted-aminoalkanol or by reacting a reactive ester of a 4,5,6,7-tetrachloro-2-hydroxyalkyl-isoindoline with an appropriate trisubstituted amine, wherein the reactive esterified hydroxy groups are preferably halogen atoms.

The 2-lower alkyl-4,5,6,7-tetrachloro-isoindolines mentioned above may be obtained from 3,4,5,6-tetrachlorophathalic anhydride by first making the corresponding imides by reaction with the mono (lower)-alkylamine followed by reduction of the imide with lithium aluminum hydride according to the procedures described herein. A 2-hydroxyalkyl-4,5,6,7-tetrachloro-isoindoline and reactive esters thereof may be prepared by treating tetrachlorophthalic anhydride with 2-aminoethanol to form the corresponding imide, and reduction with lithium aluminum hydride as described followed by esterification with an appropriate acid such as hydrochloric acid, etc.

The products of the invention are useful as ganglionic blocking agents and may be administered either parenterally or orally, for example in cases of hypertension. They are of especial interest for oral administration. For the purpose of administration, the compounds may be made up in the form of tablets, ampoules and other dosage forms. Any suitable carrier or vehicle may be employed, e.g., water, gelatin, starch, magnesium, stearate, talc, vegetable oils, benzyl alcohol, gums, polyalkylene glycol, petroleum jelly, cholesterol or other known carrier substances for medicaments.

Introduction of four nuclear chlorine atoms in 2-diethylaminoethylisoindoline dimethiodide results in an unexpected and remarkable enhancement of the ganglionic blocking activity. Thus, the activity of 2-diethylaminoethyl - 4,5,6,7 - tetrachloro - isoindoline diemthiodide is eighteen fold greater than that of 2-diethylaminoethyl-isoindoline dimethiodide. The quaternized 2-di(lower) alkylaminoalkyl-4,5,6,7-tetrachloro-isoindolines are more active than the quaternized 2-piperidinoethyl-4,5,6,7-tetrachloro-isoindolines. The methyl quarternary salts of 4,5,6,7-tetrachloro - 2-(2'-dimethylaminoethyl) - isoindoline exhibit especially marked ganglionic blocking properties.

The activity of compounds of the invention expressed as the ratio of the dose required to give 50 percent inhibition of the nictitating membrane in the cat as compared to the known 2-diethylaminoethyl-isoindoline dimethiodide is summarized below, the tests being carried out according to the procedure of Acheson & Pereia, Exp. Pharm. & Therap. 87:273 (1946).

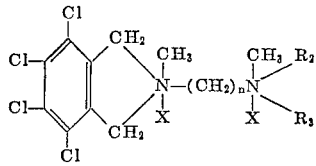

| $R_2$ | $R_3$ | $R_2$—N—$R_3$ | n | X | Activity |
|---|---|---|---|---|---|
| $CH_3$ | $CH_3$ | | 2 | I | 55 |
| $CH_3$ | $CH_3$ | | 2 | Cl | 111 |
| $C_2H_5$ | $C_2H_5$ | | 2 | I | 18 |
| | | piperidino | 2 | I | 11 |
| $CH_3$ | $CH_3$ | | 3 | I | 76 |
| $CH_3$ | $CH_3$ | | 3 | Cl | 55 |
| $CH_3$ | $CH_3$ | | 3 | $OSO_3CH_3$ | 50 |
| $C_2H_5$ | $C_2H_5$ | | 3 | I | 29 |
| | | pyrrolidino | 3 | I | 50 |
| 2-diethylaminoethyl-isoindoline dimethiodide | | | | | 1 |

The invention extends also to the 2-(di-substituted aminoalkyl)-4,5,6,7-tetrachloroisoindolines and their acid addition salts and monoquaternary lower alkyl compounds and to the N-(di-substituted aminoalkyl)-3,4,5,6-tetrachloro-phthalimides and their acid addition salts which serve as intermediates for the preparation of the quaternary derivatives.

The invention is described in greater detail in the examples that follow which are presented by way of illustration and not of limitation. Parts by weight bear the same relation to parts by volume as do grams to milliliters. Temperatures are uncorrected and are expressed in degrees centigrade.

*Example 1*

50 parts by weight of 3,4,5,6-tetrachlorophthalic anhydride is added with stirring and cooling to 30 parts by volume of 2-dimethylaminoethyl amine. The mixture is heated at 170° for 45 minutes and the oily residue then dissolved in 200 parts by volume of hot ethanol. On cooling, N-(2'-dimethylaminoethyl)-3,4,5,6-tetrachlorophthalimide separates. It crystallizes from ethanol and melts at 184–186°.

6 parts by weight of N-(2'-dimethylaminoethyl)-3,4,5,6-tetrachlorophthalimide is extracted continuously with 300 parts by volume of dry ether in which have been dissolved 3.1 parts by weight of lithium aluminum hydride. After 48 hours the excess lithium aluminum hydride is destroyed by cautious addition of 9 parts by volume of ethyl acetate while stirring. There is then added in succession with stirring 3 parts by volume of water, 6 parts by volume of 15 percent aqueous sodium hydroxide and 9 parts by volume of water. The granular precipitate of lithium and aluminum salts are filtered and washed with ether. The ether is distilled off, yielding the crude, oily 4,5,6,7-tetrachloro-2-(2'-dimethylaminoethyl)-isoindoline. The above base is dissolved in 25 parts by volume of 90 percent ethanol and refluxed 2 hours with 6 parts by volume of methyl iodide. 4,5,6,7-tetrachloro-2-(2'-dimethylaminoethyl)-isoindoline dimethiodide separates during the reaction. It is collected by filtration and recrystallized from a mixture of ethanol and water; M.P. 244–246°.

4,5,6,7-tetrachloro-2-(2'-dimethylaminoethyl)-isoindoline dimethochloride is prepared by shaking an aqueous solution of the dimethiodide with an excess of freshly prepared silver chloride and evaporating to dryness the aqueous solution after removal of the silver salts. 4,5,6,7-tetrachloro-2-(2'-dimethylaminoethyl)-isoindoline dimethochloride is recrystallized from ethanol-ethylacetate; M.P. 276–280°.

3.6 parts by weight of 4,5,6,7-tetrachloro-2-(2'-dimethylaminoethyl)-isoindoline is refluxed in 50 parts by volume of ethanol with 3.5 parts by weight of dimethyl sulfate for 2 hours. On cooling, the methosulfate crystallizes. Recrystallization from ethanol-water yields the salt of methyl sulfuric acid with 4,5,6,7-tetrachloro-2-(2'-dimethylaminoethyl)-isoindoline mono-methosulfate, which melts at 224–227°.

The 4,5,6,7-tetrachloro-2-(2'-dimethylaminoethyl)-isoindoline used as starting material can also be obtained as follows:

3.9 parts by weight of dimethylaminoethylamine is added with stirring to a suspension of 10 parts by weight of 3,4,5,6-tetrachlorophthalic anhydride in 35 parts by volume of acetic acid. Heat is evolved as the anhydride dissolves. After the reaction mixture has been refluxed 3 hours, most of the acetic acid is distilled off. While the residue is stirred with 50 parts by volume of water, concentrated ammonia is added until the mixture becomes alkaline. The N-(2'-dimethylaminoethyl)-3,4,5,6-tetrachlorophthalimide is filtered and dried. It is pure enough for further reaction without recrystallization.

6 parts by weight of N-(2'-dimethylaminoethyl)-3,4,5,6-tetrachlorophthalimide is pulverized and added to a well-stirred solution of 3.1 parts by weight of lithium aluminum hydride in ether in 300 parts by volume of dry ether. The mixture is stirred for 24 hours after which the reaction mixture is worked up as described above to yield 4,5,6,7-tetrachloro-2-(2'-dimethylaminoethyl)-isoindoline.

The 4,5,6,7-tetrachloro-2-(2'-dimethylaminoethyl)-isoindoline used as starting material for the quarternization may also be obtained as follows:

5 g. of N-(2'-dimethylamino-ethyl)-3,4,5,6-tetrachlorophthalimide are dissolved in a mixture of 20 ml. of concentrated hydrochloric acid and 105 ml. of glacial acetic acid. This solution is put in a cathode chamber having a mercury cathode. The cathode chamber is separated from an anode chamber by a permeable diaphragm; as such there is used a regenerated cellulose foil sold to the trade as "Visking" sausage skin. A platinum anode is used. The anolyte is a mixture of 20 ml. of concentrated hydrochloric acid and 105 ml. of water. At a cathodic reference potential of —4.0 volts vs. a standard calomel electrode and at a temperature of 45–50° the current density is 0.086 amp./cm.$^2$. After 282 minutes the electrolysis is discontinued and the catholyte made basic with dilute sodium hydroxide. The basic solution is then extracted with ether, the ethereal solution washed with water and dried. On evaporation of the solvent 2-(2'-dimethylamino-ethyl)-isoindoline crystallizes. It can be recrystallized from pentane and melts at 69–71°.

*Example 2*

2-diethylaminoethylamine is reacted with 3,4,5,6-tetrachlorophthalic anhydride as described in Example 1 to yield N-(2'-diethylaminoethyl)3,4,5,6-tetrachlorophthalimide; M.P. 121–122°. This is reduced with lithium aluminum hydride as described in Example 1 to 4,5,6,7-tetrachloro-2-(2'-diethylaminoethyl)-isoindoline. The latter is quaternized with methyl iodide according to the procedure given in Example 1, to yield 4,5,6,7-tetrachloro-2-(2'-diethylaminoethyl)-isoindoline dimethiodide, which after recrystallization from a methanol-water mixture melts at 243–246°.

5 parts by weight of 4,5,6,7-tetrachloro-2-(2'-diethylaminoethyl)-isoindoline dimethiodide is refluxed for 30 minutes with 30 parts by volume of 5 normal methanolic hydrogenchloride. The mixture is concentrated to dryness and recrystallized from ethanol-ethyl acetate to yield 4,5,6,7-tetrachloro-2-(2'-diethylaminoethyl)-isoindoline dimethochloride; M.P. 202–207°.

Other salts may be prepared by converting the iodide salt to the quaternary base and neutralizing with the desired acid. For example, the tartrate salt may be made by suspending 2 parts by weight of 4,5,6,7-tetrachloro-2-(2'-diethylaminoethyl)-isoindoline dimethiodide in 20 parts by volume of water and stirring with 5 parts by weight of moist silver oxide for 24 hours. The silver salts are removed, a 20 percent aqueous tartaric acid solution is added until the basic solution becomes neutral to phenolphthalein and the aqueous solution evaporated to dryness in vacuo. The residue is dissolved in a small amount of hot absolute ethanol and ethyl acetate added to turbidity. Cooling gives fine needles of the highly water soluble 4,5,6,7-tetrachloro - 2 - (2'-diethylaminoethyl)-isoindoline dimethotartrate dihydrate; M.P. 200–202°.

Example 3

2 parts by weight of 4,5,6,7-tetrachloro-2-(2'-diethylaminoethyl)-isoindoline is refluxed for 4 hours with 1.57 parts by volume of dimethyl sulfate in 10 parts by volume of ethanol. Ethyl acetate is added to precipitate a syrup which slowly crystallizes on standing at 5°. The solid is recrystallized from ethanol and melts at 200–202°. The product is 4,5,6,7-tetrachloro-2-(2'-diethylaminoethyl)-isoindoline dimethosulfate.

Example 4

10 parts by weight of potassium 3,4,5,6-tetrachlorophthalimide is dissolved in 50 parts by volume of dimethylformamide at 80°. 10 parts by volume of N-(2-chloroethyl)-piperidine is added slowly. After 15 minutes at this temperature an additional 5 parts by volume of N-(2-chloroethyl)-piperidine is added and heating continued for 30 minutes. The reaction mixture is poured into water to yield a gummy material which is crystallized from ethanol to give 3,4,5,6-tetrachloro-N-(2'-piperidinoethyl)-phthalimide; M.P. 150–152°. This is reduced with lithium aluminum hydride and the resulting 4,5,6,7-tetrachloro - 2 - (2'-piperidinoethyl)-isoindoline reacted with methyl iodide as described in Example 1 to yield 4,5,6,7-tetrachloro - 2 - (2' - piperidinoethyl)-isoindoline dimethiodide which melts at 239–242° after recrystallization from ethanol.

Example 5

To a stirred solution of 4.5 parts by weight of 3-dimethylamino propyl-amine in 100 parts by volume of benzene is added 10 parts by weight of 3,4,5,6-tetrachlorophthalic anhydride. The intermediate phthalamic acid (M.P. 195–196°) soon comes out of solution. It is not isolated but redissolves as continued refluxing causes lactaminzation to the phthalimide. After 12 hours the benzene is evaporated, leaving a residue of N-(3'-dimethylaminopropyl)-3,4,5,6-tetrachlorophthalimide which on recrystallization from ethanol melts at 125–127°. The steps of reduction and quaternization of the resulting isoindoline are carried out as described in Example 1 to yield 4,5,6,7-tetrachloro-2-(3'-dimethylaminopropyl)-isoindoline dimethiodide which after recrystallization from 90 percent ethanol melts at 228–230° (dec.).

Conversion to the corresponding dimethochloride is effected by shaking with silver chloride as described in Example 1. The dimethochloride is obtained also by direct quaternization of the isoindoline by reaction with methylchloride in methanolic solution at 125° in a closed vessel. 4,5,6,7-tetrachloro-2-(3'-dimethylaminopropyl)-isoindoline dimethochloride separates during the reaction and after recrystallization from ethanol-ethylacetate melts at 252–254° (dec.).

1 part by weight of 4,5,6,7-tetrachloro-2-(3'-dimethylaminopropyl)-isoindoline and 1.1 parts by volume of dimethylsulfate in 15 parts by volume of ethanol is refluxed for 2 hours. The ethanol is removed in vacuo and addition of ethyl acetate causes separation of the crystalline quaternary salt. It is recrystallized from an ethanol-ethyl acetate mixture to yield the purified 4,5,6,7-tetrachloro-2-(3'-dimethylaminopropyl)-isoindoline dimethosulfate; M.P. 165–168° (dec.).

Example 6

11.5 parts by weight of 3-diethylaminopropylamine is reacted with 20 parts by weight of 3,4,5,6-tetrachlorophthalic anhydride in benzene as described in Example 5. The intermediary phthalimide is reduced with lithium aluminum hydride and the resulting product quaternized with excess methyliodide as described in Example 1. The quaternary salt thus obtained is recrystallized from ethanol-water to yield 4,5,6,7-tetrachloro-2-(3'-diethylaminopropyl)-isoindoline dimethiodide; M.P. 215–220° (dec.).

Example 7

To a stirred suspension of 36 parts by weight of 3,4,5,6-tetrachlorophthalic anhydride and 100 parts by volume of acetic acid is added 14.3 parts by weight of 1-(3'-aminopropyl)-pyrrolidine. The mixture is refluxed for 3 hours, cooled and a small amount of insoluble material removed by filtration. The filtrate is reduced in volume to 1 quarter by distillation, 100 parts by volume of water are added and the mixture made basic with ammonia. The material which separates is filtered off and recrystallized from an ethanol-acetone mixture to yield purified N-(3'-pyrrolidinopropyl) - 3,4,5,6 - tetrachlorophthalimide; M.P. 157–158°. Reduction of this substance with lithium aluminum hydride as described in Example 1 gives 4,5,6,7-tetrachloro-2-(3'-pyrrolidinopropyl)-isoindoline which melts at 96–98° after recrystallization from ethanol. On treatment with methyl iodide, as described in Example 1, and recrystallization of the resulting quaternary compound from ethanol-water, 4,5,6,7-tetrachloro-2-(3'-pyrrolidinopropyl)-isoindoline dimethiodide is obtained; M.P. 207–210°.

Example 8

41.3 parts by weight of 2-(4',5',6',7'-tetrachloro-isoindolinyl - (2') - ethyl)-trimethyl-ammonium chloride is dissolved in 210 parts by volume of methanol and 93 parts by weight of methyl iodide is added. The reaction mixture is heated for seven hours at 95–100° in a closed vessel. After cooling, the crystallized product is filtered off, washed with ethanol and dried. The thus obtained 4,5,6,7-tetrachloro - 2 - (2' - dimethylaminoethyl)-isoindoline dimethiodide melts at 245–249°.

The 2-(4',5',6',7'-tetrachloro-isoindolinyl - (2') - ethyl) trimethyl-ammonium chloride used as starting material can be obtained as follows: 5 parts by weight of 4,5,6,7-tetrachloro-2-(2'-dimethylaminoethyl)-isoindoline is dissolved in 75 parts by volume of 95 percent ethanol. To this solution excess methyl chloride is added while boiling over a four hour period. The solid which separates is filtered off, washed with a mixture of ethanol and methyl-ethyl ketone (1:1) and then with ether, and dried at 50° in vacuo. The thus obtained 2-(4',5',6',7'-tetrachloro-isoindolinyl - (2') - ethyl)trimethyl - ammonium chloride after recrystallization from isopropanol melts at 256.5–258° (dec.).

Example 9

A mixture composed of 50 parts by weight of 2-(4',5',6',7'-tetrachloro-isoindolinyl - (2') - ethyl) - trimethyl-ammonium iodide and 250 parts by volume of methanol and 50 parts by volume of methyl iodide is heated in a closed vessel for seven hours at 90–100°. Upon cooling, the solid dimethiodide is filtered and washed successively with ethanol and ether and air-dried. The thus obtained 4,5,6,7-tetrachloro-2-(2'-dimethylaminoethyl)-isoindoline dimethiodide melts after further drying in vacuo at 244–246°.

The 2-(4',5',6',7' - tetrachloro-isoindolinyl-(2')-ethyl) trimethyl-ammonium iodide used as starting material is obtained as follows: 79 parts by weight of 4,5,6,7-tetrachloro-2-(2'-dimethylaminoethyl)-isoindoline is dissolved in 500 parts by volume of 85 percent aqueous ethanol and treated at the boiling point with 35 parts by weight of methyl iodide which is added as rapidly as possible. After refluxing for 5 hours, the mixture is cooled and filtered. The solid is washed with anhydrous ethanol and dried at 70° in vacuo for 4 hours. It then melts at 229-231°. On recrystallization from hot water the 2-(4',5',6',7'-tetrachloro - isoindolinyl - (2') - ethyl)-trimethyl ammonium iodide, melting at 234-236°, is obtained.

*Example 10*

4,5,6,7-tetrachloro - 2 - (2' - dimethylaminoethyl)-isoindoline dimethochloride can be made up for oral administration into tablets of the following composition:

| | Mg. |
|---|---|
| 4,5,6,7-tetrachloro - 2 - (2' - dimethylaminoethyl) isoindoline dimethochloride | 100.0 |
| Tragacanth | 6.0 |
| Lactose | 177.5 |
| Corn starch | 7.5 |
| Talcum powder | 7.5 |
| Magnesium stearate | 1.5 |
| | 300.0 |

These tablets are made by mixing the quaternary salt with tragacanth and then with lactose until the mixture is homogenous. It is then granulated with 50 percent ethanol to form a moist mass, which is passed through a No. 10 screen and dried. After passing it through a No. 16 screen, the material is mixed with the corn starch, talcum and magnesium stearate, and the mixture compressed into tablets in the usual way.

In the same manner a tablet containing 50 mg. of the mentioned diquaternary salt can be obtained having the folowing composition:

| | Mg. |
|---|---|
| 4,5,6,7-tetrachloro - 2 - (2' - dimethylaminoethyl) isoindoline dimethochloride | 50.0 |
| Tragacanth | 4.0 |
| Lactose | 135.0 |
| Corn starch | 5.0 |
| Talcum powder | 5.0 |
| Magnesium stearate | 1.0 |
| | 200.0 |

*Example 11*

43 parts by weight of 4,5,6,7-tetrachloro-2-(2'-dimethylaminoethyl)-isoindoline, 130 parts by volume of dimethyl formamide and 43 parts by volume of methyl iodide are refluxed with stirring for 4 hours. After cooling, the precipitated product is filtered off, washed with acetone and dried. The thus obtained 4,5,6,7-tetrachloro-2-(2' - dimethylaminoethyl)-isoindoline dimethoiodide melts at 242-245°.

*Example 12*

100 parts by weight of 4,5,6,7-tetrachloro-2-(2'-dimethylaminoethyl)-isoindoline dimethiodide are suspended in 1200 parts by volume of anhydrous 3 N methanolic hydrogen chloride and refluxed until all material has dissolved. The solution is concentrated to a low volume in vacuo and methyl ethyl ketone added to precipitate 4,5,6,7-tetrachloro-2-(2'-dimethylaminoethyl) isoindoline dimethochloride described in Example 1. It is filtered off, washed with methyl ethyl ketone and recrystallized from 3.4 parts by volume of anhydrous ethanol.

*Example 13*

100 parts by weight of 4,5,6,7-tetrachloro-2-(2'-dimethylaminoethyl)-isoindoline are dissolved in 350 parts by volume of methanol and 250 parts by weight of methyl iodide, diluted with 50 parts by volume of methanol added gradually. The reaction mixture begins to reflux and the monoquaternary compound, 2-(4'5',6',7'-tetrachloro-isoindolinyl-(2')-ethyl)-trimethylammonium iodide crystallizes. After cooling to room temperature the mixture is transferred to an autoclave and heated for 8 hours to 95-100°. After cooling, 4,5,6,7-tetrachloro-2-(2'-dimethylaminoethyl)-isoindoline dimethiodide described in Example 1 is filtered off, washed with alcohol and dried.

*Example 14*

To 2 parts by weight of 4,5,6,7-tetrachloro-2-(2'-dimethylaminoethyl)-isoindoline in 6 parts by volume of dimethylformamide are added 1.25 parts by volume of acid free dimethylsulfate and the whole heated for 1 hour at 100°. After cooling ethyl acetate is added to complete the crystallization. The thus formed 4,5,6,7-tetrachloro-2-(2'-dimethylaminoethyl)-isoindoline dimethosulfate is filtered off and melts at 288-292° (dec.).

*Example 15*

10.5 parts by weight of 1-(2'-aminoethyl)-morpholine are added dropwise with stirring to a solution of 20 parts by weight of 3,4,5,6-tetrachlorophthalic anhydride in 100 parts by volume of acetic acid. The reaction mixture is refluxed for 2 hours, then ¾ of the acetic acid is removed in vacuo. The residue is diluted with water and made basic with ammonia, precipitating the imide. The imide is filtered and after recrystallization from ethanol, N-(2'-morpholinoethyl)-3,4,5,6-tetrachlorophthalimide melts at 165-167°.

20 parts by weight of N-(2'-morpholinoethyl)-3,4,5,6-tetrachlorophthalimide are slurried with anhydrous ether and added dropwise to a suspension of 5.8 parts by weight of lithium aluminum hydride in 250 parts by volume of anhydrous ether. After refluxing for 18 hours, the reaction mixture is decomposed with 75 parts by volume of ethyl acetate followed by 5.8 parts by volume of water, 11.6 parts by volume of 15 percent sodium hydroxide and finally 17.4 parts by volume of water. The reaction mixture is then diluted with ether and filtered. Evaporation of the ether yields a semi-solid residue. The thus obtained 4,5,6,7-tetrachloro-2-(2' - morpholinoethyl)-isoindoline is purified by recrystallization from ethanol-water; M.P. 110-112°.

The corresponding dimethiodide is prepared by refluxing a solution of 4 parts by weight of 4,5,6,7-tetrachloro-2-(2'-morpholinoethyl)-isoindoline in 10 parts by volume of dimethyl formamide with 15 parts by volume of methyl iodide for 4 hours.

Some solid material is filtered off and ethyl acetate added to the filtrate. The resulting gummy material is crystallized by rubbing with ethyl acetate. Purification of the thus obtained 4,5,6,7-tetrachloro-2-(2'-morpholinoethyl)-isoindoline dimethiodide is achieved by recrystallization from aqueous ethanol-ethyl acetate; M.P. 189-192°.

What is claimed is:

1. A member of the group consisting of compounds of the formula:

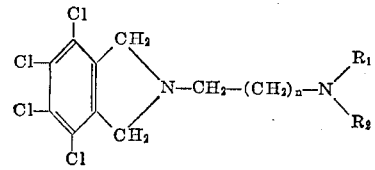

wherein $R_1$ and $R_2$ are members selected from the group consisting of lower alkyl and, when taken together, alkylene and oxaalkylene of 4 to 5 carbon atoms, and $n$ is a whole number from 1 to 2, their acid addition salts, monoquaternary lower alkyl ammonium compounds and therapeutically useful di-quaternary lower alkyl ammonium compounds.

2. Quaternary derivatives of N-(substituted-aminoalkyl)-tetrachloro-isoindolines of the formula:

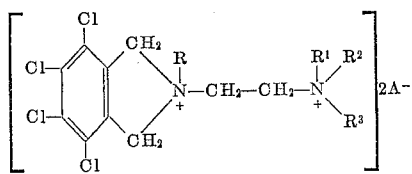

wherein R, R¹, R² and R³ represent lower alkyl and A⁻ is a therapeutically useful anion.

3. Therapeutically useful dimetho-quaternary salts of 4,5,6,7 - tetrachloro - 2-(2' - dimethylaminoethyl)-isoindoline.

4. 4,5,6,7-tetrachloro - 2 - (2'-dimethylaminoethyl)-isoindoline dimethochloride.

5. 4,5,6,7 - tetrachloro-2-(2'-diethylaminoethyl) - isoindoline dimethochloride.

6. 4,5,6,7-tetrachloro-2 - (3' - dimethylaminopropyl)-isoindoline dimethochloride.

7. 4,5,6,7 - tetrachloro-2 - (3' - pyrrolidinopropyl)-isoindoline dimethiodide.

8. 4,5,6,7-tetrachloro - 2 - (2' - morpholinoethyl)-isoindoline dimethiodide.

9. 4,5,6,7 - tetrachloro-2-(2'-dimethylaminoethyl)-isoindoline.

10. 4,5,6,7-tetrachloro-2 - (2' - diethylaminoethyl)-isoindoline.

11. 4,5,6,7-tetrachloro-2 - (3' - dimethylaminopropyl)-isoindoline.

References Cited in the file of this patent
UNITED STATES PATENTS

| | | |
|---|---|---|
| 2,223,303 | Lazier | Nov. 26, 1940 |
| 2,443,888 | Bohrer | June 22, 1948 |
| 2,807,624 | Grogen et al. | Sept. 24, 1957 |
| 2,846,382 | Allen | Aug. 5, 1958 |
| 2,873,281 | Rosen | Feb. 10, 1959 |

OTHER REFERENCES

Jour. Am. Chem. Soc., vol. 68, pp. 1657–8 (1946).
Rice et al.: J. Amer. Chem. Soc., vol. 75, pp. 4911–4915 (Oct. 20, 1953).